United States Patent Office 3,313,458
Patented Apr. 11, 1967

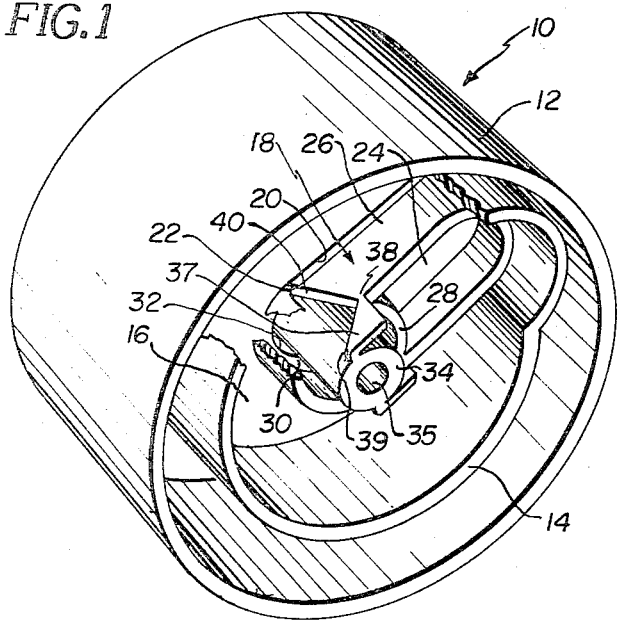
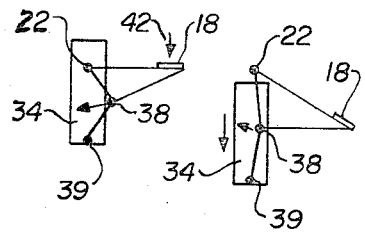
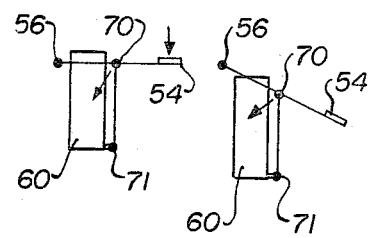
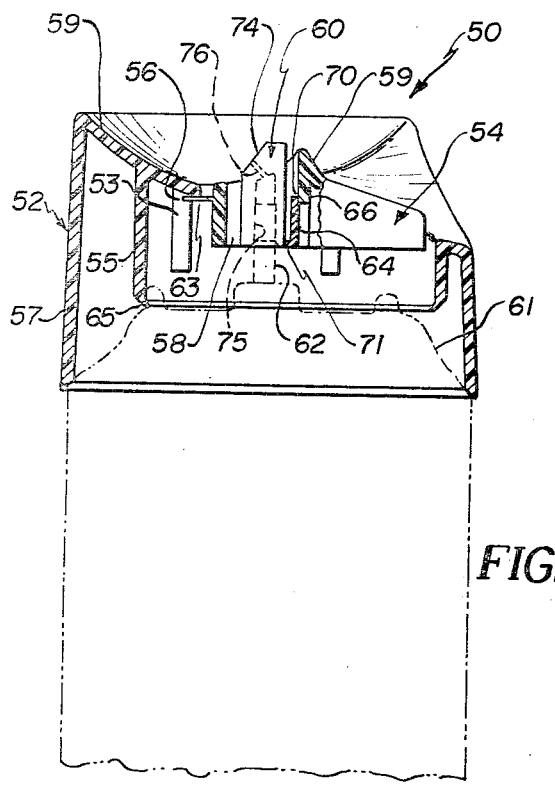
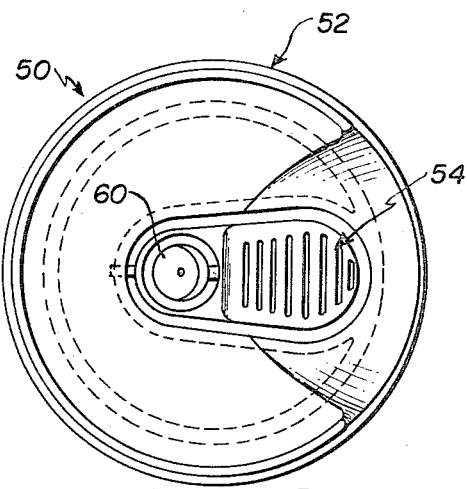

3,313,458
TOGGLE LINK ACTUATOR FOR AXIALLY
RECIPROCABLE AEROSOL VALVE
Arthur R. Braun, 209 E. Mildred,
Cary, Ill. 60013
Filed Aug. 9, 1965, Ser. No. 478,239
10 Claims. (Cl. 222—402.13)

This invention relates to an actuator for an aerosol valve, and more particularly, to an actuator having a unique link-lever action as well as a valve button swivel movement whereby the actuating force to open the valve is substantially minimized and leakage is substantially reduced, if not entirely eliminated.

As is well known, aerosol valves generally utilize a spring biased hollow or solid valve stem which extends upwardly out of the valve. This stem must be depressed to cause release of the pressurized product within the can. In the hollow stem type valve, the released product travels through an orifice in the wall of the stem and out through its top. In the solid stem type valve, the released product travels up between the stem and the upwardly extending discharge tube. The actuator is fixed to the valve stem or to the discharge tube.

To properly seal the valve stem, a spring is generally employed under the stem. It supplements the sealing force generated by the pressurized gas within the container against the bottom of the valve. The force of this spring and the pressurized gas is generally quite substantial. It usually requires a considerable force to upset the seal so that the product can be released.

Many actuators for aerosol valves have been devised, but in most instances, they are difficult to operate and, in addition, are generally subject to leakage, upon operation. It has been found that these objectionable characteristics are the result of tilting of the valve stem when it is depressed so that movement of the valve stem does not correspond with the vertical axis of the valve. The valve stem therefore binds within the valve body and mounting cup and considerable pressure is required to overcome such binding action. Also, the valve stem is generally seated within a cavity formed in the actuator and the tilting of the valve stem unseats it from the base of the cavity and considerable leakage may occur.

It is therefore an object of the present invention to provide a new and improved actuator.

It is another object of the present invention to provide a new and improved actuator, wherein the actuation pressure necessary to operate, or depress, the valve stem is substantially reduced.

It is another object of the present invention to provide a new and improved actuator, wherein leakage is substantially reduced, if not eliminated.

It is still another object of the present invention to provide a new and improved actuator, wherein the valve stem is moved along the vertical axis of the valve so that binding of the valve stem upon operation is substantially eliminated.

It is still another object of the present invention to provide a new and improved actuator comprising three elements which co-act with one another to minimize the pressure required to operate the valve stem and to substantially eliminate leakage.

It is still another object of the present invention to provide an actuator which, although comprising three elements, may be made by a single molding of plastic.

Other objects of the invention will in part be obvious and will in part appear hereinafter.

The above outlined objectives are accomplished by an actuator structure which, in accordance with a first embodiment of the invention, generally comprises a structure capable of being mounted eiher upon the outer seam edge or the inner mounting cup rim of an aerosol can. Said structure may be a substantially flat disc having gripping fingers, or a vertically disposed tubular wall structure, adapted to grip the outer seam edge or the cup rim. Within said structure is a fingerpiece which is secured to a wall and is adapted to be pivotally actuated about a first pivot point. The fingerpiece has a cavity in which is located a valve button. The button mounts upon the end of a valve stem.

The valve button is retained within the cavity by link members which are positioned on opposite sides thereof. The links are secured to the fingerpiece to form a second and third pivot point. During operation, the fingerpiece pivots about the first pivot point. The second pivot point is forced to move in an arcuate manner toward the axis of the valve button. Such movement of the second pivot point forces the third pivot point to move downwardly and since the third pivot point is affixed to the valve button, the button, likewise, moves vertically downward, in line (axially) with the valve stem. Since the valve stem is not tilted, and since leverage is accomplished via the link arrangement, actuation pressure is minimized and leakage is substantially eliminated.

In accordance with a second embodiment of the invention, the fingerpiece of the actuator is pivotally affixed to a wall via a forwardly extending lever tab not connected directly to the wall, at a first pivot point. Vertically extending links are connected to the fingerpiece and to the valve button in a manner so as to form a second and a third pivot point. During operation, the fingerpiece pivots at the first pivot point and exerts a force at the second pivot point, which force is translated to the third pivot point to force it vertically downward. Since the third pivot point is again connected to the valve button, the valve button is likewise moved vertically downward.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a bottom perspective view of an actuator exemplary of the present invention, partially sectioned to illustrate its construction.

FIGURES 2a and 2b are diagrammatic representations of the pivot points of the actuator of FIG. 1, and the forces resulting when a downward force is exerted upon the fingerpiece.

FIGURE 3 is a side view of an actuator constructed in accordance with a second embodiment of the invention, partially sectioned to illustrate its structure;

FIGURE 4 is a top plain view of the actuator of FIG. 3; and

FIGURE 5a and 5b are diagrammatic representations of the pivot points of the actuator of FIG. 3, and forces resulting when a downward force is exerted upon the fingerpiece.

Similar reference characters refer to similar parts throughout the several views of the drawing.

Referring now to the drawing, in FIG. 1 there is shown an actuator 10 having a tubular support wall 12, an interior wall 14 which is generally circular in shape and is adapted to attach the actuator 10 to an aerosol can and a top wall 16 which is convex shaped and forms a bridge connecting and supporting the walls 12 and 14.

A fingerpiece 18 is integrally formed and connected with the top wall 16 of the actuator 10, at 22, the top wall having an aperture 20 formed therein about the fingerpiece 18 so that the fingerpiece can be pivotally actuated at the connection point 22, hereinafter referred to as pivot point 22. The fingerpiece 18 is generally oval in shape and has a top wall 24, a skirt 26 which depends downwardly beneath the top wall 24 and about its edge and, if desired a semi-circular shaped wall 28 which, in conjunction with a portion of the side wall 26, forms a tubular shaped cavity 30. Wall 28 may be omitted, if desired, but it provides rigidity to the fingerpiece and is preferably used.

An aperture 32 is formed in the top wall 16 of the actuator 10, centrally within the cavity 30. A tubular valve button 34 is received within the aperture 32 and has a valve stem cavity 35 and a dispensing orifice (not shown) formed therein, extending from the valve stem cavity 35.

The fingerpiece 18 has a link member 37 depending downwardly on each side of the valve button 34. Each is secured at the top end 38 to the skirt 26 of the fingerpiece 18 and at the bottom end 39 to the lower end of the valve stem 34, the connecting points being hereinafter referred to as pivot points 38 and 39, respectively.

In FIGS. 2a and 2b, the above described pivot points 22, 38 and 39 are diagrammatically represented by the dots which are correspondingly numbered, and the operation of the fingerpiece 18 in activating the valve button 34, along a vertical axis, can be clearly observed. When a force is exerted downwardly on the fingerpiece 18, as represented by the arrow 42, the fingerpiece pivots at pivot point 22.

A force is exerted upon the pivot point 38, and the pivot point 38 is forced to the left (as shown). As the pivot point 38 is forced to the left, the pivot point 39 is forced vertically downward. Relating this action to the structure of the actuator 10, it will be observed that when a downward force is exerted upon the fingerpiece 18, it pivots at pivot point 22 which is fixed. The pivot point 38 being integral with fingerpiece 18 is therefore forced to the left in an arcuate path. This causes pivot point 39 of link member 37, to move downwardly and point 39 is integral with the valve button 34, the button 34 must move vertically downward in an axial manner. The valve stem which is fixedly retained within the valve stem cavity 35 prevents the valve button from moving sideways.

Therefore, when the actuator 10 is affixed to an aerosol can and the valve stem of the associated aerosol valve is received within the valve stem cavity 35 of the valve stem button 34, the valve stem is actuated, in line with its vertical axis. Binding is therefore eliminated, and less pressure is required to actuate the aerosol valve. For the same reason, leakage is substantially eliminated since the valve stem is not upset within the valve stem cavity.

Referring now to FIGS. 3–5, an actuator 50, constructed in accordance with a second embodiment of the invention, is shown having an upright tubular support wall structure 52 and a fingerpiece 54 which pivots about a horizontal axis such as the provided by lever pivot support surface 56 on the tubular support wall 52. The fingerpiece 54 has a valve button cavity 58 formed therein which extends through its enlarged head portion 59. Within the cavity 58 is located a valve button 60 which is mounted upon the valve stem 62 of an aerosol valve. A vertically extending narrow wall section 64 integrally connected with the fingerpiece 54 and the button 60, transmits any depressive force on the fingerpiece to the button, and the button, in turn, depresses the valve stem in a manner described more fully hereinafter.

The tubular support wall structure 52, as shown is a double wall structure consisting of an inner wall 55 and an outer wall 57 coinciding with the wall of the aerosol can, with a bridge 59 connecting the upper end of both walls. It could also be a single wall structure fitting onto the edge of the valve mounting cup 61. The lever pivot support surface 56 is provided by constructing a third inner wall 63 which is preferably arcuate in shape to form a wall within the wall structure 52 for the fingerpiece 54. The lower edge of inner wall 63 acts as the lever pivot support surface 56.

If desired, vertical ribs 53 may be former on the inner wall 55 to provide added strength to the wall. These terminate short of the lower edge of the inner wall and act as stops against the upper surface of the valve mounting cup 61. Inwardly slanted annular anchor lip 65 on the bottom edge of the inner wall 55 provides a snap-fit arrangement whereby the actuator 50 can be easily secured to the valve mounting cup.

The fingerpiece 54, comprises an over-shaped inverted cup structure, with an inner circular-shaped wall 66 formed therein. The wall 66 in conjunction with the front wall of the fingerpiece form the cavity 58 in the enlarged head portion 59. If desired, a solid block structure can be utilized and the cavity 59 formed therein, but the hollow inverted cup structure is preferred because it saves material and lightens the weight of the fingerpiece.

The wall section 64 is integrally formed with the end of the wall 66 of the fingerpiece 54 and the lower end of the valve button 60, within the cavity 58. The upper and lower connecting points of the wall section 64 (as shown) form pivot points 70 and 71, respectively, and as explained below, function to transmit a force from the fingerpiece to the valve button, and hence to the valve stem of the aerosol valve, to depress it when the fingerpiece 54 is actuated.

The valve button 60 is cylindrical in shape and has one side of its top tapered, as at 74. A valve stem receiving cavity 75 and a smaller terminal orifice 76 which extends from the cavity 75 to the tapered surface 74, is formed centrally within the valve button 60.

Referring now to FIGS. 5a and 5b, the operation of the actuator 10 is represented diagrammatically and, the pivot points 56, 70 and 71 are represented by the dots which are correspondingly numbered. As can be observed, when the fingerpiece 54 is actuated it pivots at pivot point 56, and the pivot point 70 which is affixed to the fingerpiece, spaced from the pivot point 56, is forced downward. The force exerted upon pivot point 70 is transmitted by the wall section 64, to the pivot point 71 which is therefore likewise forced downward. Since pivot point 71 is not affixed with respect to pivot points 56 and 70 and is affixed to the valve button 60, the valve button 60 is forced vertically downward. The valve stem 62 within the cavity 75 of the valve button 60 is therefore also forced vertically downward, in line with its vertical axis and that of the aerosol valve. Binding is therefore eliminated and the pressure required to actuate the aerosol valve is minimized. Leakage is also substantially eliminated since the valve button is not tilted.

With the description of two embodiments of actuator, more aptly referred to as a toggle-link actuator, it should be realized that the invention resides in the unique toggle link arrangement and that this arrangement could be used in a variety of actuator structures. For example, the pivot points could be shifted to effect better leverage, or more extended movement of the valve button, or less pivot movement of the fingerpiece. Also, a horizontally operated push button type structure or a similarly operated structure which bears directly upon the movable pivot point to move it toward the axis of the valve button can be used to effect the same above described action. Ancillary thereto, locks could be incorporated to block the actuator in a valve actuation or a valve non-actuation condition. It should be evident that many variations or additions are possible.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An actuator for an aerosol valve comprising a structure capable of being mounted upon said aerosol valve, a valve button adapted to be secured to a valve stem retained within said structure, first lever means having one end fixed to said structure forming a first pivot point, second lever means having one end fixed to said valve button forming a second pivot point, the other ends of said first and second lever means being pivotally secured to one another forming a third pivot point, means for moving said third pivot point whereby said second pivot is moved downward with respect to said first pivot point, to thereby move said valve button downward, and a discharge passage formed in said valve button.

2. An actuator for an aerosol valve comprising an outer tubular wall structure capable of being mounted upon said aerosol valve, said wall structure having a valve button cavity formed therein, a valve button adapted to be secured to a valve stem retained within said valve button cavity, toggle means including a pair of lever arms pivotally secured to one another at one of their ends, the opposite end of one said lever arm being fixed to said wall structure and the opposite end of the other said lever arm being fixed to said valve button, means adapted to bear upon the pivotal connecting point of said lever arms to move said point to move said valve button vertically downward, and a discharge passage formed in said valve button.

3. An actuator for an aerosol valve comprising an outer tubular wall structure capable of being mounted upon said aerosol valve, said wall structure having a fingerpiece cavity formed therein, a fingerpiece supported within said fingerpiece cavity, toggle means including a pair of lever arms pivotally secured to one another at one of their ends and forming a first pivot point, a valve button adapted to be secured to a valve stem retained within said wall structure, the opposite end of one said lever arm being fixed to said wall structure and forming a second pivot point, the opposite end of the other said lever arm being fixed to said valve button and forming a third pivot point, said first pivot point being moved when said fingerpiece is actuated and moving said third pivot point vertically downward, to thereby move said valve button vertically downward, and a discharge passage formed in said valve button.

4. An actuator for an aerosol valve comprising an outer tubular wall structure capable of being mounted upon said aerosol valve, said wall structure having a fingerpiece cavity formed therein, a fingerpiece pivotally supported within said fingerpiece cavity at a first pivot point and having a valve button cavity formed therein, a valve button adapted to be secured to a valve stem retained within said valve button cavity by means affixed to said fingerpiece and to said valve button and forming second and third pivot points, respectively, said second pivot point being moved toward the axis of said valve button and moving said third pivot point downward when said fingerpiece is pivoted about said first pivot point, to thereby move said valve button vertically downward, and a discharge passage formed in said valve button.

5. An actuator for an aerosol valve comprising an outer tubular wall structure capable of being mounted upon said aerosol valve, said wall structure having a fingerpiece cavity formed therein, a fingerpiece pivotally supported within said fingerpiece cavity at a first pivot point and having a valve button cavity formed therein, a valve button retained within said cavity adapted to be secured to a valve stem, lever means having its ends affixed to said valve button and to said fingerpiece and forming a second pivot point and a third pivot point, respectively, said third pivot point being displaced in an arcuate path toward the axis of said valve button when said fingerpiece is pivoted about said first pivot point and said movement of said third pivot point forcing said second pivot point to move vertically downwardly, to thereby move said valve button vertically downward, and a discharge passage formed in said valve button.

6. An actuator for an aerosol valve comprising an outer tubular wall structure capable of being mounted upon said aerosol valve, said wall structure having a fingerpiece cavity formed therein, a fingerpiece pivotally supported within said fingerpiece cavity at a first pivot point and having a valve button cavity formed therein, a valve button adapted to be secured to a valve stem, a pair of lever arms having one end thereof affixed to said fingerpiece to form a second pivot point and the other end thereof affixed to said valve button to form a third pivot point, said pair of lever arms moving said valve button vertically when said fingerpiece is pivoted, at said first pivot point, and a discharge passage formed in said valve button.

7. An actuator, as claimed in claim 6, wherein said pair of lever arms are formed integrally secured with said fingerpiece and said valve button.

8. An actuator for an aerosol valve comprising an outer tubular wall structure capable of being mounted upon said aerosol valve, said wall structure having a fingerpiece cavity formed therein, a fingerpiece pivotally supported within said fingerpiece cavity at a first pivot point and having a valve button cavity formed therein, a valve button adapted to be secured to a valve stem, means affixed to the side wall of said valve button cavity and to said valve button forming a second and a third pivot point, said second pivot point being moved and moving said third pivot point vertically downward, to thereby move said valve button vertically downward when said fingerpiece is pivoted about said first pivot point, and a discharge passage formed in said valve button.

9. An actuator for an aerosol valve comprising an outer tubular wall structure capable of being mounted upon said aerosol valve, said wall structure having a fingerpiece pivotally supported within a fingerpiece cavity formed therein at a first pivot point and having a valve button cavity formed therein; a valve button adapted to be secured to a valve stem, lever means affixed at one end to the side wall of said valve button cavity to form a second pivot point, the other end of said lever means being affixed to the lower end of said valve button to form a third pivot point, said second pivot point being moved vertically when said fingerpiece is pivoted about said first pivot point and moving said third pivot point vertically, whereby said valve button is moved vertically, and a discharge passage formed in said valve button.

10. An actuator, as claimed in claim 9, wherein said lever means is formed integrally fixed to said fingerpiece and to said valve button.

References Cited by the Examiner

UNITED STATES PATENTS

| | | | |
|---|---|---|---|
| 2,887,273 | 5/1959 | Anderson et al. | 239—337 |
| 3,109,565 | 11/1963 | Kutik | 239—579 X |
| 3,138,331 | 6/1964 | Kutik | 222—509 X |
| 3,149,761 | 9/1964 | Harris et al. | 222—394 |
| 3,189,232 | 6/1965 | Joffe | 239—579 X |

RAPHAEL M. LUPO, *Primary Examiner.*